US012646418B2

(12) United States Patent (10) Patent No.: US 12,646,418 B2

Pappada et al. (45) Date of Patent: Jun. 2, 2026

(54) ARTIFICIAL INTELLIGENCE-BASED PLATFORM TO OPTIMIZE SKILL TRAINING AND PERFORMANCE

(71) Applicant: The University of Toledo, Toledo, OH (US)

(72) Inventors: Scott M. Pappada, Toledo, OH (US); Brent D. Cameron, Toledo, OH (US); Mohammad Hamza Owais, Toledo, OH (US); Mahmoud Eladawi, Toledo, OH (US)

(73) Assignee: The University of Toledo, Toledo, OH (US)

( * ) Notice: Subject to any disclaimer, the term of this patent is extended or adjusted under 35 U.S.C. 154(b) by 871 days.

(21) Appl. No.: 17/792,809

(22) PCT Filed: Jan. 14, 2021

(86) PCT No.: PCT/US2021/013355
§ 371 (c)(1),
(2) Date: Jul. 14, 2022

(87) PCT Pub. No.: WO2021/146368
PCT Pub. Date: Jul. 22, 2021

(65) Prior Publication Data
US 2023/0039882 A1 Feb. 9, 2023

Related U.S. Application Data

(60) Provisional application No. 62/961,891, filed on Jan. 16, 2020.

(51) Int. Cl.
| | |
|---|---|
| *G09B 9/00* | (2006.01) |
| *G06F 3/01* | (2006.01) |
| *G06Q 10/0639* | (2023.01) |

(52) U.S. Cl.
CPC ............... *G09B 9/00* (2013.01); *G06F 3/015* (2013.01); *G06Q 10/06398* (2013.01)

(58) Field of Classification Search
CPC .................................................... G09B 9/00
USPC ......................................................... 434/219
See application file for complete search history.

(56) References Cited

U.S. PATENT DOCUMENTS

| | | | |
|---|---|---|---|
| 10,783,801 | B1 | 9/2020 | Beaubien et al. |
| 2014/0170609 | A1 | 6/2014 | Hsiao et al. |
| 2018/0307801 | A1 | 10/2018 | Hardee et al. |
| 2019/0340956 | A1 | 11/2019 | Lindkvist et al. |
| 2020/0008725 | A1 | 1/2020 | Bach et al. |

OTHER PUBLICATIONS

Pappada et al, Establishing an instrumented training environment for simulation-based training of health care providers: an initial proof of concept, International Journal of Academic Medicine 2 (1), 32-40 (Year: 2016).*
International Search Report and Written Opinion, Application No. PCT/US21/13355, dated Mar. 26, 2021.

(Continued)

*Primary Examiner* — Thomas J Hong
(74) *Attorney, Agent, or Firm* — MacMillan, Sobanski & Todd, LLC

(57) ABSTRACT

Artificial intelligence-based systems and methods for learning management are described.

16 Claims, 8 Drawing Sheets
(2 of 8 Drawing Sheet(s) Filed in Color)

(56) References Cited

OTHER PUBLICATIONS

Zhou et al., "Multimodal Physiological Signals for Workload Pre-
diction in Robot-assisted Surgery", ACM Trans. Human-Robot
Interaction, (2020), vol. 9, No. 2, Article 12, pp. 1-33, URL:
https://dl.acm.org/doi/fullHtml/10.1145/3368589.
Ricci et al., "User Modeling, Adaptation and Personalization", 23rd
International Conference, UMAP (2015), Dublin, Ireland, Jun.
29-Jul. 3, 2015, Proceedings, Springer, Lecture Notes in Computer
Science, 9146.

* cited by examiner

ARTIFICIAL INTELLIGENCE-BASED PLATFORM TO OPTIMIZE SKILL TRAINING AND PERFORMANCE

RELATED APPLICATIONS

This is the national phase entry of international application PCT/US2021/013355 filed under the authority of the Patent Cooperation Treaty on Jan. 14, 2021, published; which claims priority to U.S. Provisional Application No. 62/961,891 filed under 35 U.S.C. § 111(b) on Jan. 16, 2020. The entire disclosure of each of the aforementioned applications is expressly incorporated herein by reference for all purposes.

STATEMENT REGARDING FEDERALLY SPONSORED RESEARCH

This invention was made with no government support. The government has no rights in this invention.

BACKGROUND

Currently, training or education across multiple domains and professions is completed using a "one size fits all" curriculum, where there is no dynamic personalization for a given learner. Instead, mission critical professions such as healthcare, emergency first responders, and the military often use rudimentary pass/fail or checklists to evaluate performance and competence.

Learning management systems and advanced performance assessment systems currently exist. However, measures derived or generated by these systems are non-standardized, insufficient, and do not characterize the complete picture of skill acquisition and real-world performance. Known learning management systems also suffer from a lack of multi-modal assessment and built-on models that require data to be made available that are not available across training and operational domains, and therefore have limited applicability. Thus, there is a need for new and improved systems and methods for assessing and conducting training or otherwise managing learning.

SUMMARY

Provided is a system for aiding in the training or assessment of performance of discipline-specific knowledge and skills, the system comprising a wearable device comprising one or more sensors, wherein the wearable device is configured to receive signals from the one or more sensors and transmit the signals, wherein the wearable device is configured to be worn by a learner; and an artificial intelligence component communicatively coupled to the wearable device and configured to receive the signals transmitted from the wearable device, learn from the received signals, and produce an output based on the received signals selected from the group consisting of: a prediction of a need for the learner to undergo training, a recommendation for a type of training for the learner to undergo, a recommendation for a frequency of training for the learner to undergo, a prediction of an expertise level of the learner, an evaluation of real-world performance of a skill, an evaluation of training effectiveness, or a dynamic personalization of training.

In certain embodiments, the system comprises algorithms and analytics to automatically measure performance or specific events related to curriculum via video and/or image analysis to provide dynamic data assessment and evaluation capabilities. In particular embodiments, the system automates assessment.

In certain embodiments, the system comprises a training mode configured to collect and generate data regarding training or educational activities.

In certain embodiments, the system comprises a real-world performance mode configured to collect and generate data and measures during real-world tasking and activities. In particular embodiments, the data and measures are related to training data to gauge effectiveness of training.

In certain embodiments, the system is configured for daily 24-hour monitoring to track changes in a learner's state or lifestyle that may impact performance and/or learning capacity. In particular embodiments, the wearable device comprises physiological or neurophysiological wearable sensors. In particular embodiments, the physiological or neurophysiological sensors are configured to be worn 24-hours a day to identify patterns and trends in physiological and activity status that may indicate learner or user state as it relates to their ability to learn or perform optimally in real-world operational settings.

In certain embodiments, the system provides real-time feedback to a user on learner state such that curriculum or working conditions can be dynamically modified.

In certain embodiments, the system tracks real-world performance of a skill, or associates training effectiveness with real-world performance data.

In certain embodiments, the system provides analytics that automatically associate measures and data collected to training outcomes and real-world performance.

In certain embodiments, all data or measures collected by the system are standardized across multiple disciplines and domains. In particular embodiments, the standardized data or measures allows for the system to accept and account for missing data and generate measures and results and recommendations if any data is missing.

In certain embodiments, intelligent data visualizations associate data and measures with training and performance outcomes. In particular embodiments, the intelligent data visualizations are driven by models.

In certain embodiments, the system uses unsupervised machine learning. In particular embodiments, the unsupervised machine learning comprises clustering or anomaly detection. In particular embodiments, the unsupervised machine learning identifies groups of similar learners or performers based on measures and data collected over time with the system that can be associated with training or performance outcomes.

In certain embodiments, the system associates training effectiveness with real-world performance data. In certain embodiments, the system tracks real-world performance data. In certain embodiments, the wearable device obtains neurophysiological or behavioral data.

In certain embodiments, the system is configured to collect pre-assessments and post-assessments, wherein the pre-assessments and post-assessments gather data related to important demographics and subject specific conditions that may impact learner performance or their ability to learn. In particular embodiments, the demographics and subject specific conditions include lifestyle or genetics factors. In particular embodiments, the post-assessments quantify effectiveness of curriculum and knowledge gained related to real-world performance. In particular embodiments, the pre-assessments or post-assessments gather data that includes self-reported measures. In particular embodiments, the self-reported measures comprise medical/procedural knowledge with objective responses, sleep quality for prior night and past week, and caffeine consumption.

In certain embodiments, the system provides automated data-driven recommendations in real-time or retrospectively.

In certain embodiments, the wearable device comprises a watch or other device configured to be worn on the learner's wrist. In certain embodiments, the wearable device comprises a headband, goggles, helmet, or other head mounted device (HMD). In certain embodiments, the wearable device comprises a watch, a RFID unit stitched into a bib, a shirt, or other garment or clothing. In certain embodiments, the system comprises two or more wearable devices. In particular embodiments, neurophysiological, molecular biomarker, and behavioral wearables are used in tandem.

In certain embodiments, the wearable device is configured to obtain one or more signals including but not limited to: electrocardiography (ECG) data, photoplethysmography (PPG) data, respiration data, linear motion data, skin temperature data, rotational motion data, heart rate data, pulse data, peripheral capillary oxygen saturation (SpO2), electrical impedance, electroencephalogram (EEG), functional near-infrared spectroscopy (FNIRS) data, eye tracking data, pupilometry data, gaze pattern data, voice stress data, biomarker data, and genetic marker or fingerprint data.

In certain embodiments, the wearable device is configured to obtain two or more of electrocardiography (ECG) data, photoplethysmography (PPG) data, respiration data, linear motion data, skin temperature data, rotational motion data, heart rate data, pulse data, peripheral capillary oxygen saturation (SpO2), electrical impedance, electroencephalogram (EEG), functional near-infrared spectroscopy (FNIRS) data, eye tracking data, pupilometry data, gaze pattern data, voice stress data, biomarker data, and genetic marker or fingerprint data.

In certain embodiments, the wearable device is configured to obtain three or more of electrocardiography (ECG) data, photoplethysmography (PPG) data, respiration data, linear motion data, skin temperature data, rotational motion data, heart rate data, pulse data, peripheral capillary oxygen saturation (SpO2), electrical impedance, electroencephalogram (EEG), functional near-infrared spectroscopy (FNIRS) data, eye tracking data, pupilometry data, gaze pattern data, voice stress data, biomarker data, and genetic marker or fingerprint data.

In certain embodiments the system collects data from eye tracking technologies that measure data and factors including but not limited to visual/gaze behaviors, pupillometry (pupil dilation), voice stress analysis, etc. In certain embodiments, peripheral physiological measures, behavioral, and other system measures are accompanied by assessment of neurophysiological or cortical activity measured from the brain (via EEG or FNIRs).

In certain embodiments, the system collects data from wearable, noninvasive/unobtrusive, and point-of-care sensors that monitor molecular biomarkers or similar data sources.

In certain embodiments, the system can compensate for potential missing data or measures.

In certain embodiments, the system further comprises software for pairing signal quality index to biosignals measured by the wearable device in order to provide a confidence evaluation for derived measures. In certain embodiments, the artificial intelligence component uses machine learning. In certain embodiments, the artificial intelligence component comprises modeling approaches including but not limited to: an artificial neural network (ANN), a multilayer neural network, a recursive neural network, a deep neural network, a multi-class support vector machine (SVM), a decision tree, a random forest, a gradient boosted tree, a linear regression model, a logistic regression model, a Bayesian model, or a hidden Markov model. In certain embodiments, the artificial intelligence component creates a model to classify learner expertise level, predict learner performance, recommend future training, and dynamically personalize learning or training.

Further provided is a method for managing learning, the method comprising acquiring data on a standardized set of neurophysiological measures relating to a learner, wherein the data is acquired through a wearable device worn by the learner; and building models from the acquired data to make predictions about real-world performance of a skill by the learner, make predictions about a need for training by the learner, make a recommendation for a type of training for the learner to undergo, make a recommendations for a frequency of training for the learner to undergo, make a prediction of an expertise level of the learner, make an evaluation of real-world performance of the skill, make an evaluation of training effectiveness, or dynamically personalize training for the learner.

In certain embodiments, the method further comprises collecting and integrating data regarding one or more of learner demographics and experience level in a discipline, instructor-documented performance ratings, preassessment data and results, frequency and duration of simulation exposure, post-assessment data and results, medical or procedural knowledge, sleep quality for prior night and preceding week, and caffeine consumption. In particular embodiments, the data includes self-reported measures from a user.

In certain embodiments, the neurophysiological measures comprise one or more of electrocardiography (ECG) data, photoplethysmography (PPG) data, respiration data, linear motion data, skin temperature data, rotational motion data, heart rate data, pulse data, peripheral capillary oxygen saturation (SpO2), electroencephalogram (EEG), functional near-infrared spectroscopy (fNIRS) data, eye tracking data, pupilometry data, gaze pattern data, voice stress data, biomarker data, and genetic marker or fingerprint data.

In certain embodiments, the neurophysiological measures comprise two or more of electrocardiography (ECG) data, photoplethysmography (PPG) data, respiration data, linear motion data, skin temperature data, rotational motion data, heart rate data, pulse data, peripheral capillary oxygen saturation (SpO2), electroencephalogram (EEG), functional near-infrared spectroscopy (fNIRS) data, eye tracking data, pupilometry data, gaze pattern data, voice stress data, biomarker data, and genetic marker or fingerprint data.

In certain embodiments, the neurophysiological measures comprise three or more of electrocardiography (ECG) data, photoplethysmography (PPG) data, respiration data, linear motion data, skin temperature data, rotational motion data, heart rate data, pulse data, peripheral capillary oxygen saturation (SpO2), electroencephalogram (EEG), functional near-infrared spectroscopy (fNIRS) data, eye tracking data, pupilometry data, gaze pattern data, voice stress data, biomarker data, and genetic marker or fingerprint data.

In certain embodiments, the method comprises mapping learning events to specific skills or knowledge intended to be trained within a scenario or curriculum. In particular embodiments, the mapping of learning events is standardized such that data can be combined with comprehensive datasets across a diverse set of learners or disciplines to develop universal or discipline specific sets of artificial intelligence or machine learning-based models.

In certain embodiments, the wearable device comprises a headband, goggles, helmet, or other device configured to be worn on the learner's head. In certain embodiments, the wearable device comprises a watch or other device configured to be worn on the learner's wrist. In certain embodiments, the wearable device comprises a shirt or other garment. In certain embodiments, the system collects data from wearable, noninvasive/unobtrusive, and point-of-care sensors that monitor molecular biomarkers or similar data sources.

In certain embodiments, algorithms and analytics are used to automatically measure performance or specific events related to curriculum via video and/or image analysis to provide dynamic data assessment and evaluation capabilities.

In certain embodiments, the method comprises collecting data regarding training or educational activities of the learner. In certain embodiments, the method comprises collecting data regarding real-world performance of a skill by the learner.

In certain embodiments, the learner wears the wearable device for 24-hours a day to track changes in the learner's state or lifestyle that may impact performance and/or learning capacity, or to identify patterns and trends in physiological and activity status that may indicate learner state as it relates to their ability to learn or perform optimally in real-world operational settings.

In certain embodiments, the method further comprises providing real-time feedback to the learner regarding learner state such that curriculum or working conditions can be dynamically modified. In certain embodiments, the method further comprises tracking real-world performance of a skill, or associating training effectiveness with real-world performance data. In certain embodiments, the method further comprises providing analytics that automatically associate measures and data collected to training outcomes and real-world performance.

In certain embodiments, the method further comprises accounting for missing data and generating measures and results and recommendations if any data is missing. In certain embodiments, the method further comprises identifying groups of similar learners based on measures and data collected over time that can be associated with training or performance outcomes.

In certain embodiments, the method further comprises tracking real-world performance data. In certain embodiments, the wearable device obtains neurophysiological or behavioral data.

In certain embodiments, the method further comprises collecting pre-assessments and post-assessments, wherein the pre-assessments and post-assessments gather data related to important demographics and learner-specific conditions that may impact learner performance or their ability to learn. In particular embodiments, the post-assessments quantify effectiveness of curriculum and knowledge gained related to real-world performance. In particular embodiments, the pre-assessments or post-assessments gather data that includes self-reported measures.

In certain embodiments, the method further comprises providing automated data-driven recommendations in real-time or retrospectively.

Further provided is a system that makes automated assessments provided by models and analytics generated from data about a learner acquired by a wearable device worn by the learner, wherein the assessments relate to training or real-world performance of a skill by the learner.

In certain embodiments the measures collected and derived by the system provides feedback to instructors/faculty or supervisors as to the state of the learner or operator providing indicator related to training effectiveness and/or the learner/operators state as it relates to their capabilities to learn or perform at an optimal level.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Simulation-based medical education (SBME) has become a routine educational intervention to train and prepare healthcare providers to become effective in their discipline/role. SBME offers a unique risk-free environment where current and future healthcare providers can be challenged and pushed to their limit with unique patient cases without any harm coming to a patient. Although SBME has become quite common, due to lack of standardized assessment and evaluation criteria, it is difficult to quantify the proficiency level of a SBME participant and how much (or if any) additional training is necessary and when to implement training to avoid skill decay. Even though a healthcare provider may be considered proficient, studies show that skill decay can occur in three- to six-months when real-world experience or refresher training is not available. There is a critical need in the simulation community for an intelligent system to serve as a virtual coach to personalize training for an individual healthcare provider by providing assessment of knowledge/skill acquisition over time as well as make recommendations on future training requirements.

Figure 1:
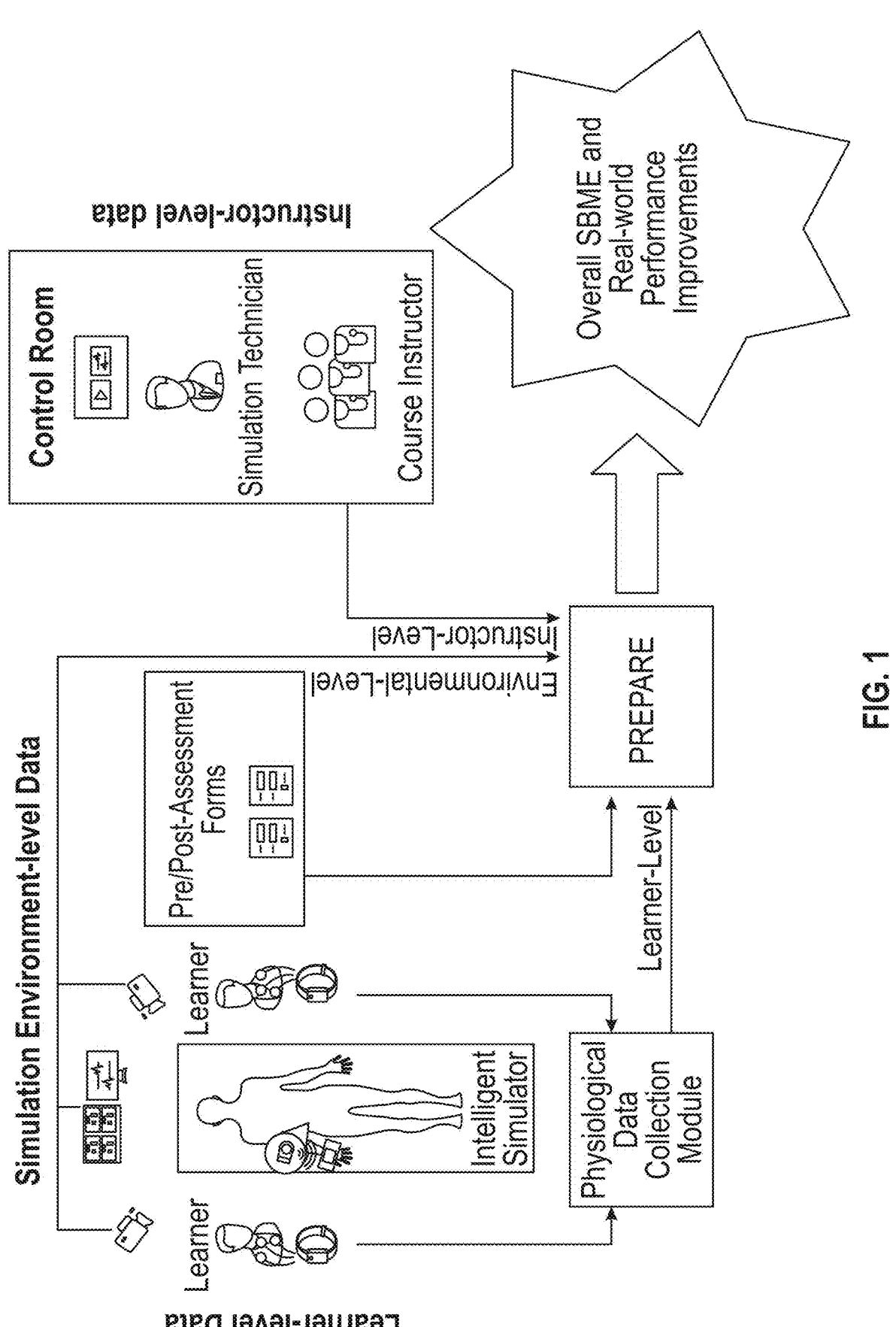
FIG. 1: Illustration of a non-limiting example embodiment of a learning management system.
Figure 2:
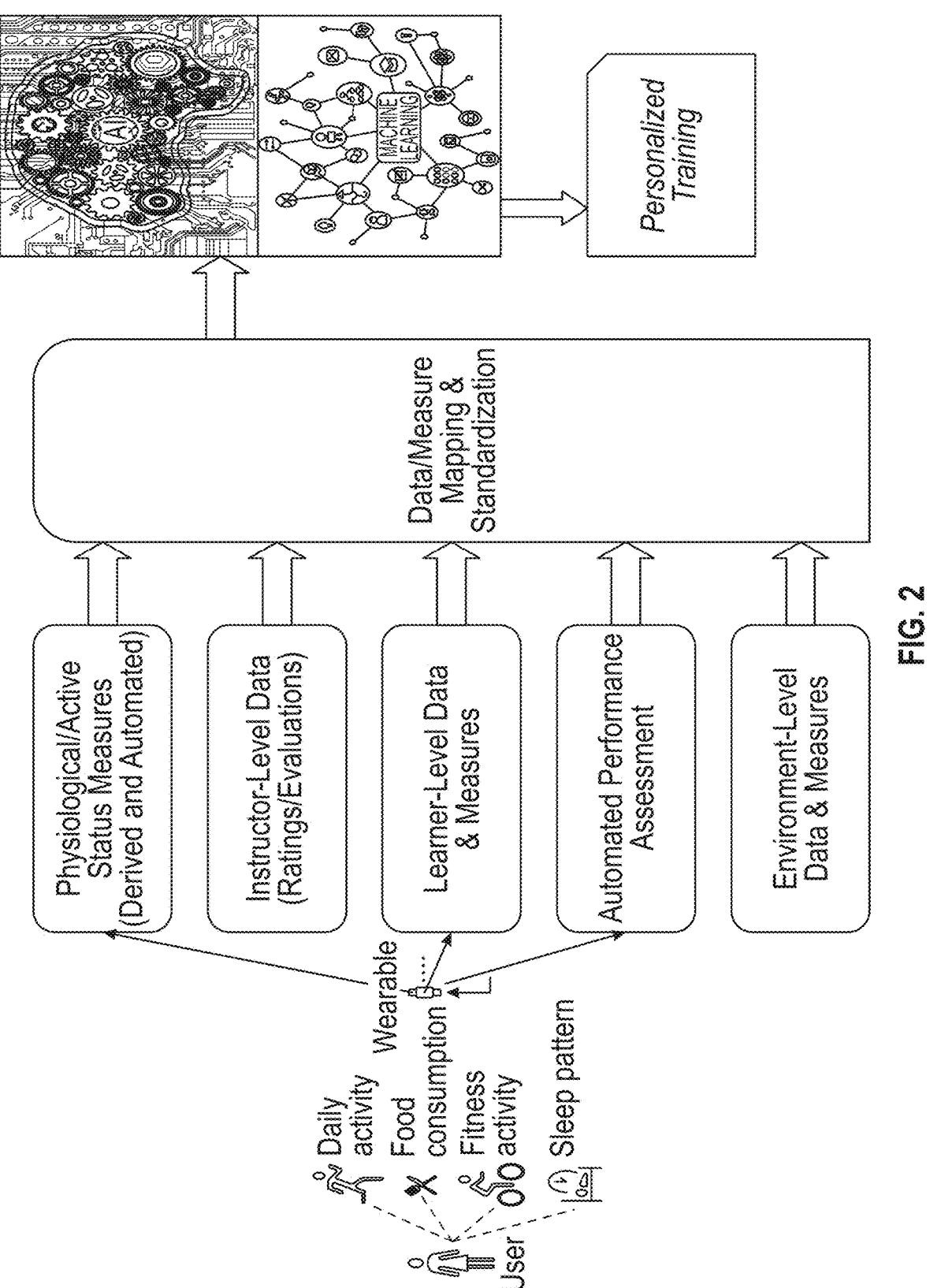
FIG. 2: Illustration of a non-limiting example embodiment of a learning management system.

Artificial intelligence can offer unique abilities to a learning management system, allowing for a learner to better understand curriculum and for the learning and training process to be optimized for each learner. Provided herein is a fused artificial intelligence-based system developed to optimize training and performance. (FIGS. 1-2.) The system utilizes wearable or other sensing technologies that are capable of monitoring and collecting a broad range of multimodal neurophysiological, lifestyle, and behavioral assessment data inputs in an unobtrusive and automated manner which are compiled and encoded by a learning management system in a manner that is conducive to the development of machine learning-based and artificial intelligence models to classify and predict expertise levels as well as recommend future training requirements and curriculum content required to maintain skill levels and avoid skill decay. The system may also be applied to enhance personalized training goals and to maintain proficiencies over a wide range of applications. The system associates objective measures collected from neurophysiological sensors, wearables, and processed or "mined" video/image data with subjective and objective measures of knowledge/skill acquisition and decay, and performance generated by the system and collected by instructors, faculty, and domain experts in order to provide a personalized training experience and optimize real-world performance.

A set of measures that promote standardization of assessment across multiple disciplines can be used by the system in addition to sets of institution- or discipline-specific measures. Furthermore, the system may incorporate a set of algorithms that extract important features from neurophysiological, molecular biomarker, and behavioral wearables used in tandem with the platform to associate changes in neurophysiological responses and derived-measures with skill acquisition, proficiency, expertise, and maintenance. An algorithm may be used to extract baseline physiological measures and normalize them to measure a percentage deviation from algorithm-derived baseline states. This allows measures to be made consistent across participants and independent of individual physiological variability that exists across subjects. Other algorithms can be used to extract relevant physiological measures that indicate, or act as predictors of, performance, such as measures of stress. Functional states such as stress or cognitive load/mental demands can be measured by neurophysiological responses that can be monitored. Physiological responses indicating stress or other states will differ, and their magnitude will decrease over time as skill/knowledge levels increase and remain at an expert level, and these changes can be monitored by the system and used to make predictions or recommendations.

The system involves a multi-modal assessment platform that provides standardized measures and artificial intelligence to personalize training and enhance real-world performance. The system is capable of assessing the impact of highly complex neurophysiological, molecular biomarkers, genetic fingerprints/factors, lifestyle, and behavioral data relationships in the performance and learning process, and provides an augmented and more effective training or skill acquisition experience. The system may collect data in a standardized format, providing the infrastructure for artificial intelligence/machine learning model development and implementation over time. The system may include algorithms that derive a set of neurophysiological, molecular biomarkers, genetic fingerprints/factors, and behavioral measures that are standardized across all system users that enables machine learning-based models to be developed for a broad population of learners tracked via the learning management system platform.

In general, the system includes a wearable component and an artificial intelligence component. The wearable component may be any wearable device capable of generating input data from a user (i.e., a learner) wearing the wearable device, and transmitting the input data to the artificial intelligence component, such as wirelessly, for example through a Bluetooth connection, or through cloud-based connectivity. Thus, the wearable device is communicatively coupled to the artificial intelligence component. The artificial intelligence component may be run on any suitable computing device or processor, including a processor physically housed within the wearable device. However, the computing device or processor does not need to be housed within the wearable device, and may be disposed in any remote location. In embodiments in which the computing device or processor is physically removed from the wearable device, the wearable device may transmit wirelessly, such as through Bluetooth or over a cloud-based network, to the computing device or processor so as to transmit the input data generated by the wearable device to the artificial intelligence component. The wearable device may include Bluetooth 5 (BLE) capability, which supports long-range mode (e.g., up to about 800 ft). The wearable component may further include security features such as, but not limited to, CryptoCell.

The system can be used with custom-designed wearables built explicitly for the intended system functionality, or alternatively (or in addition) can leverage data from commercially available wearables (due to the system design). However, a problem with commercially available wearables is that the signals provided by them are heavily averaged. This is comes at the detriment of an artificial intelligence system, which performs better upon receiving non-processed signals such that instantaneous trends and patterns in data can be observed and derived. Thus, in certain embodiments, the wearable component of the system does not average the signals provided. The wearable component may therefore be a commercially available wearable that has been suitably modified to reduce the amount of data averaging or modifying undertaken by the wearable device. The wearable device may be a custom solution that may include a headband, goggles, helmet, or other head mounted device (HMD), a watch, a RFID unit stitched into a bib, a shirt, or any other garment or clothing item capable of including electrodes to obtain data. Furthermore, in some embodiments, the wearable component includes two or more wearable devices. Thus, the wearable component may include two or more garments such as a headback and a watch, or a helmet and a shirt, and so on. Collection of vital signs may be through non-obtrusive technologies integrated as part of a user's garment. In other words, the wearable component does not require a special sensor application or use of adhesive electrodes.

Figure 3:
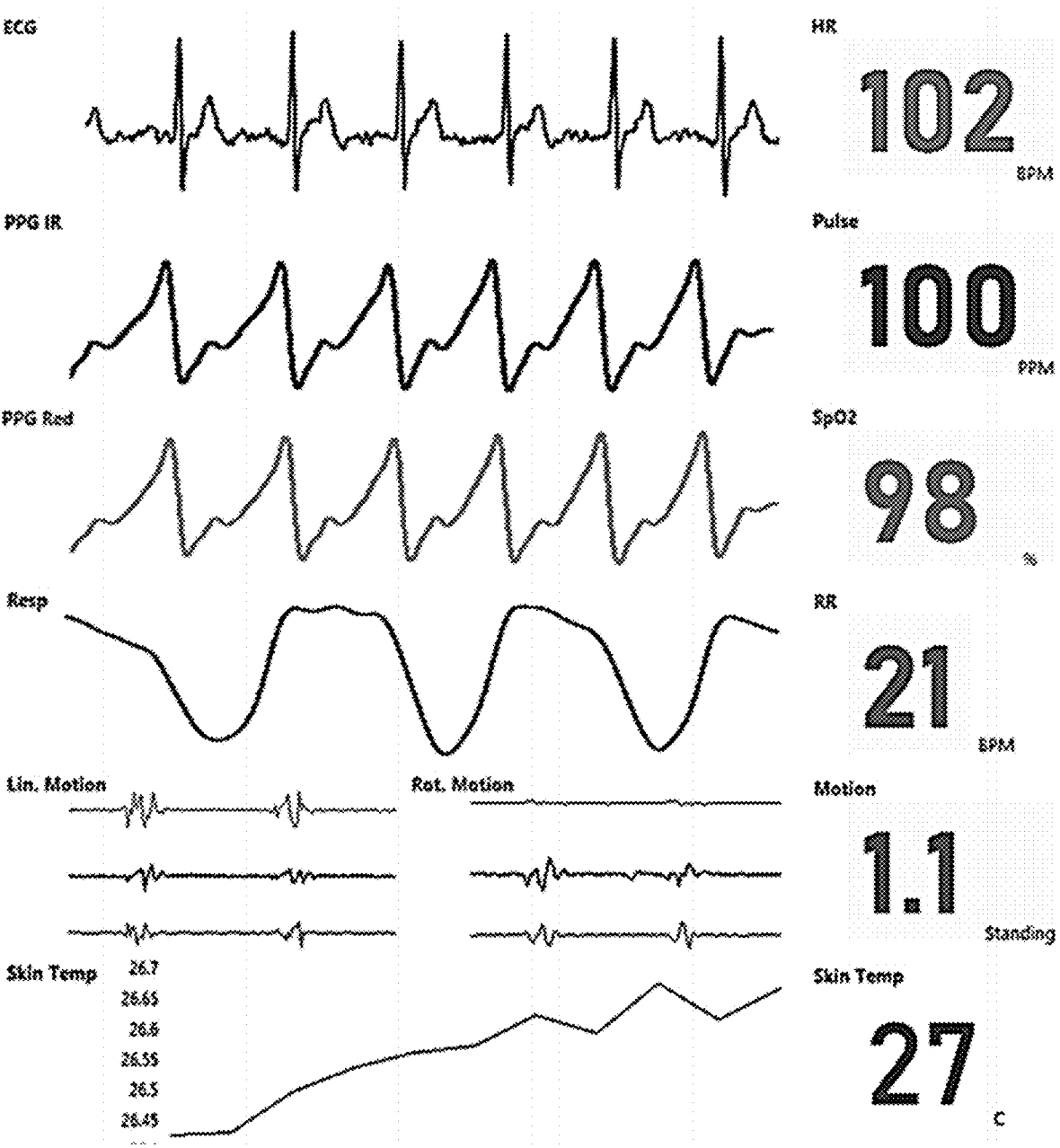
FIG. 3: Illustration showing example data generated from a wearable component.

In some embodiments, the wearable component is configured to acquire physiological data from a user wearing the wearable component, and transmit the acquired data to a server. The wearable component is configured to work during periods of high activity, but may also be configured to acquire data while a user is sleeping or otherwise not active. The wearable component may acquire neurophysiological or behavioral data such as those shown in FIG. 3. This neurophysiological or behavioral data may include, but is not limited to: electrocardiography (ECG) data), photoplethysmography (PPG) data, respiration, linear motion, skin temperature, rotational motion, heart rate, pulse, peripheral capillary oxygen saturation (SpO2), electroencephalogram (EEG), functional near-infrared spectroscopy (fNIRS), eye tracking data, pupillometry data, gaze pattern data, voice stress data, biomarker data, genetic marker/fingerprint data, and any combination thereof. This neurophysiological data may be acquired through various sensors and techniques. For example, the wearable component may include a single channel ECG for detecting hear rate. Bioimpedance based respiration data may be acquired using the same ECG leads. A pulse oximeter may be included to acquire SpO2 and heart rate data. Linear and rotational motion (posture tracking) can be detected with suitable movement detecting components such as cameras, gyroscopes, accelerometers, magnetometers, acoustic sensors, global positioning systems, and the like. A far-infrared medical grade body temperature sensor may be included for acquiring temperature data. EEG or fNIRs data can be collected from a set of sensors embedded within a head-worn wearable such as a helmet, cap, head band, or any other wearable with a similar footprint. The wearable component may further include software for pairing signal quality index to measured biosignals to provide a confidence evaluation for derived measures. In some embodiments, the wearable component may be configured for the real-time noninvasive extraction of one or more biomarkers from a user.

The wearable component allows for better system integration, data security, and enhanced data measures that include more accurate or evaluated temporal data. The wearable component also allows for an enhanced assessment of capabilities and more intelligence to better derive a more comprehensive and useful dataset.

The artificial intelligence component may include any type of machine learning algorithm or device, artificial neural network (ANN), multilayer neural network, recursive neural network, deep neural network, decision tree model (e.g., decision trees, random forests, or gradient boosted trees), linear regression model, logistic regression model, support vector machine ("SVM"), Bayesian models, hidden Markov models (HMMs), artificial intelligence device, or any other type of intelligent computer system. Any type of statistical modeling technique can be incorporated into the system. The artificial intelligence system can analyze the acquired data to identify patterns, trends, behaviors, deficiencies, or proficiencies. The artificial intelligence component may be able to classify and predict learner skill level with a sufficient number of classes (e.g., novice, intermediate, and expert), and model performance and ability to compensate for potential missing data or measures. The artificial intelligence system may be a learning management system (LMS) and classify and predict participant skill level, recommend future training requirements, with a focus on recommending frequency of training, to improve or maintain skill level and avoid skill decay. This various functionality allows for the system to serve as a virtual coach by providing automated data-driven recommendations (in real-time or retrospectively) to participants and instructors. The input data may be encoded by the LMS platform in a manner conducive to the development of machine learning-based and artificial intelligence models to classify and predict expertise levels as well as recommend future training requirements and curriculum content required to maintain skill levels and avoid skill decay.

Measures may be encoded as both discrete (class) and continuous numeric data points. For example, each learning event may be encoded by an instructor as a discrete performance measurement (novice, intermediate, or expert), then encoded as a 0-100 rating by measuring performance on a red to green color-coded scale. Overall performance of the participant may be rated by the instructor into three distinct classes of novice, intermediate, and expert. Furthermore, neurophysiological data associated with performance and expertise (e.g., heart rate) is collected around these "learning events" relative to baseline/resting states. This enables the collection of a wealth of data in a standardized and consistent format in a hierarchical fashion. Notably, in some embodiments, the acquired data is not data related to the particular skill the learning of which the system is being used to manage. Rather, the acquired data is a standardized set of neurophysiological data that may be acquired from a learner for use in managing the learning of any skill.

Any number of types of models can be employed. For example, one type of model may be classifiers which serve to provide classification of learner knowledge/skill at the broad skills, generalized skills, discipline specific skills, and overall skills level into one of three discrete classes: novice, intermediate, or expert. Another type of model may be to predict knowledge/skill level improvement, maintenance, or decay by predicting future skill levels at the broad, generalized, and discipline specific skill levels on a continuous 0-100 performance measurement scale that is collected for each learning event. With this model, it is possible to forecast or predict future trends in learning or performance. The predictions generated by this model can be used for future training requirements or training frequency recommendation functionality. ANNs are well-suited for this model functionality including discrete classification, function approximation/nonlinear regression, and time series prediction. Multiple ANN model architectures may be employed, including but not limited to: multilayer perceptions and time-delay neural networks to provide the model functionality. In addition to the machine learning-based models, the system may include advanced analytics that drive improved data visualization capabilities. These analytics may include simple statistical analyses such as generating distributions or frequencies (for ordinal data) of measures of skill documented across participants and individualized plots to show each participant their knowledge/skill level in relation to their peers. Frequency of exposure to training, and duration of training, are further important measures that may be subjected to statistical analysis. Additional functionality such as filtering and modifying plots and data visualizations by age, years of experience, and gender are possible via database queries and calculations that can be completed upon request. These allow experienced learners using the system to identify potential areas of improvement or areas on which to focus future training.

If a given model is determined to be not sufficiently accurate, alternative modeling approached and model architectures can be utilized, including multi-class support vector machines and random forests, which are also well-suited to accomplish the discrete classification and regression functionality described herein.

The system may further collect and integrate data such as participant demographics (e.g., age, gender, race, ethnicity) and experience level in the relevant discipline, instructor-documented performance ratings, preassessment data and results, frequency and duration of simulation exposure, and post-assessment data and results. This data may include self-reported measures such as medical/procedural knowledge with objective responses, sleep quality for prior night and past week, and caffeine consumption, which may be relevant to determine whether a participant is coming into the simulation session in a conducive state of learning. If a participant is significantly fatigued, performance during a particular session may be an outlier and not indicative of true expertise or skill level. Furthermore, caffeine may impact performance, and cause changes in physiological measurements (e.g., elevated heart rate from resting baseline state).

Using the predictions of the 0-100 quantitative measures of performance at various hierarchical levels generated and collected by the system, it is possible to predict learning curves (skill acquisition, maintenance, and decay) based on an exposure frequency to the system which can be varied as a model input to the model to automatically generate an optimal training recommendation. This allows the models to recommend the optimal frequency of exposure to training that leads to skill maintenance and avoidance of decay. Similarly, the models may classify and predict overall proficiency into a set of finite classes such as for example: novice, intermediate, and expert.

The artificial intelligence component may include a network, which is defined as one or more data links and/or data switches that enable the transport of electronic data between computer systems, modules, and/or other electronic devices. When information is transferred, or provided, over a network (either hardwired, wireless, or a combination thereof) to a computer, the computer properly views the connection as a transmission medium. The wearable component can include one or more communication channels used to communicate with the network. Transmissions media include a network that can be used to carry data or desired program code means in the form of computer-executable instructions or in the form of data structures. Further, these computer-executable instructions can be accessed by a general-purpose or special-purpose computer. Combinations of the above are also included within the scope of computer-readable media.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination thereof) through a network each perform tasks (e.g., cloud computing, cloud services, and the like). In a distributed system environment, program modules may be located in both local and remote memory storage devices.

Additionally, or alternatively, the functionality described herein can be performed, at least in part, by one or more hardware logic components. For example, and without limitation, illustrative types of hardware logic components that can be used include Field-Programmable Gate Arrays (FPGAs), program-specific or application-specific integrated circuits (ASICs) program-specific standard products (ASSPs), system-on-a-chip systems (SOCs), complex programmable logic devices (CPLDs), central processing units (CPUs), and other types of programmable hardware.

Furthermore, the artificial intelligence component may include one or more processors and one or more computer-readable hardware storage devices, where the storage devices include computer-executable instructions that are executable by the one or more processors to perform any method. Such computer systems are highly flexible and can perform numerous operations.

The artificial intelligence component can be integrated with any suitable wearable device with only minor algorithms. Therefore, the system is not tethered to a particular wearable device. Rather, different wearable devices may be used in the system at different times for different purposes.

The system may monitor a learner throughout the day, including by monitoring lifestyle (sleep quality), active status (fatigue), emotional states (stress/anxiety), and the like. This is a dynamic approach that is important for improving learning and performance, because learning and performance are not based on a single "snapshot" of a subject/learner's performance measures at any instance in time. Learning is a process and cannot be characterized by data and measures collected at any single point in time. As such, the system may illustrate trends in skill acquisition and maintenance over time. The system provides automated assessments provided by models and analytics generated from data about a user acquired by a wearable device worn by the user, where the assessments relate to training and real-world performance of a skill by the user.

The system can provide comprehensive measurement capabilities with initial analytics to identify trends and learner knowledge/skill acquisition and the effectiveness of curricula amongst its various system measures. As more data is collected during system use, the artificial intelligence capabilities to automate assessments made by the system and recommend frequency of future training exposure, personalized curriculum, and monitoring of real-world performance and data related to it will improve from the machine learning capabilities.

The system may provide comprehensive measurement and assessment capabilities to optimize training and consequently real-world performance of professionals in training from multiple domains. The system may be employed, for example, with medical simulations to personalize and manage the training of a medical practitioner. The system may undertake 24/7 monitoring and assessment of learners or operators (anyone expert in a domain such as a healthcare provider), before, during, and following training of a particular skill or skill set. This helps characterize how lifestyle may impact performance as well as the state of the person being monitored, which can be considered as a condition to better achieve optimal performance and learning. Other aspects may include tracking sleep-wake cycles, anxiety, stress, and other important states.

The system may use a set of measures that promote standardization of assessment across multiple disciplines rather than a set of institution or discipline-specific measures, which it also may provide. The system may have a set of analytics and models that provide the ability of the system to personalize training exposure for a given learner. The system may have a set of analytics that automate some assessments for faculty and instructors that use computer vision and natural language processing to detect when specific events occur and provide an automated performance evaluation based on factors such as timeliness which can be quantified by information added to the system. The system may be implemented with a completely customizable curriculum that contains learning events mapped to specific measurable endpoints that are all mapped to curriculum goals and objectives defined within the system.

The system may include analytics that automatically present potential strengths and deficiencies in curriculum to instructors to help guide curriculum modification and development. The system may include analytics and models that recommend exposure sequences for curriculum (i.e., course module A first, course module D second, course module B third, and course module C last) which will optimize learner skill acquisition, proficiency, expertise, and maintenance.

The system may include customizable pre- and post-assessment forms allowing instructors to collect learner demographics, real-world experience, and responses to questions which map to specific goals and objectives to track knowledge and skills before and after training. The data may be used directly by models and analytics to gauge effectiveness of curriculum as well as to personalize training of learners monitored by the system.

The system may include machine learning-based models that recommend optimal frequency of training to avoid skill decay (using as measures collected and documented by the system throughout use). Machine learning and artificial intelligence can be embedded in the system to enable the system to act autonomously as a virtual coach. Utilization of the system over time will help learners possess and maintain the skills conveyed via simulation. The system may include automated smart systems to achieve enhanced or optimized training. Because of the machine-learning nature of the artificial intelligence component, the more data that is gathered by the wearable component and fed to the artificial intelligence component, the more accurate and reliable the system becomes.

The system can fully characterize learning, knowledge, skill acquisition, and real-world performance. Learning and performance cannot be characterized at a single training instance or across multiple training sessions without having a standardized set of measures that can apply across multiple domains, as well as monitoring learner/operator state during and the days/weeks leading up to the training or real-world performance.

The system may generate its predictions or recommendations through a graphical user interface (GUI) with any suitable visual layout. The GUI may be displayed through an app on a smart device such as a phone or tablet. The system thus uses a comprehensive data set to manage learning through artificial intelligence and create a personalized learning experience.

EXAMPLES

Figure 4:
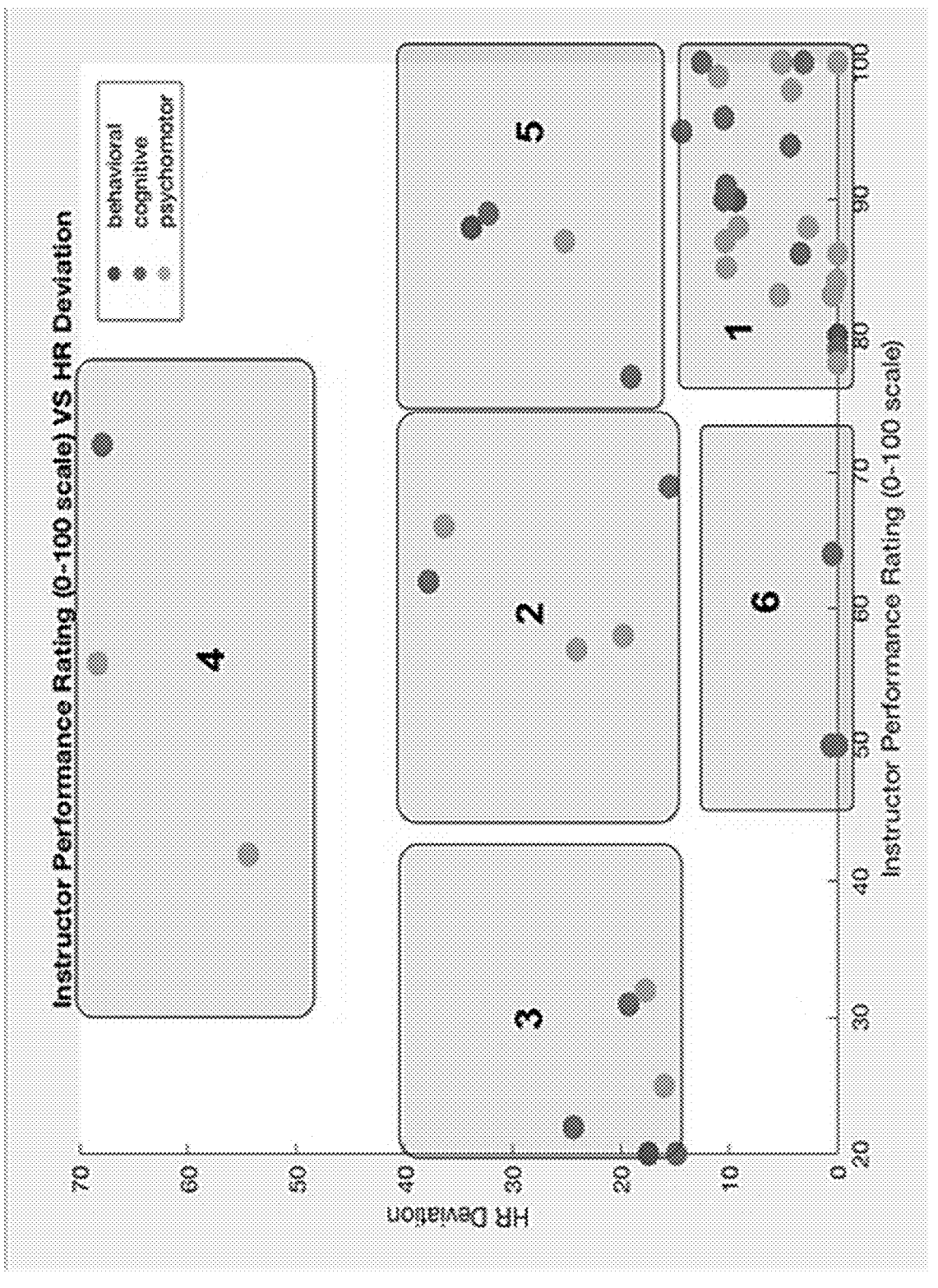
FIG. 4: Data collected with a wearable devices demonstrates that algorithm-derived physiological measures (e.g., heart rate and electrodermal activity) during assessment are correlated with the performance of learners. The data indicates a relationship between heart rate and performance.

An example intelligent, multi-faceted learning management system referred to as PREPARE (prediction of healthcare provider skill acquisition and future training requirements) was built and evaluated as a "measure it all" cloud-based framework at the University of Toledo's Interprofessional Immersive Simulation Center in connection with multiple skill sets including those in anesthesiology, emergency medicine, nursing, surgery, and paramedic skills. PREPARE was utilized for SBME in these fields. A commercial off-the-shelf (COTS) wearable device was coupled to the PREPARE system to gather data from the learners. Data collected with the COTS wearable devices demonstrate that algorithm-derived physiological measures (e.g., heart rate and electrodermal activity) during assessment are correlated with the performance of learners. (FIG. 4.)

PREPARE provided a platform that standardized the creation, assessment, and evaluation of the training health care providers. PREPARE supports the prediction of health-care provider skill acquisition and future training requirements. PREPARE is a data-driven multi-tiered application that collects and derives a number of measures and metrics at the learner/SBME participant, instructor, and simulation environment levels, as depicted in FIG. 1. It is completely agnostic to simulation technologies and can be implemented regardless of the specific equipment available at a simulation site. PREPARE is a web-based application including functionality that (1) allows instructors, simulation technicians, and faculty to plan and create a goal-oriented SBME curriculum in a digital format, which includes curriculum goals/objectives, customizable preassessment and post-assessment forms (to quantify baseline knowledge and knowledge gained through SBME); (2) provides the ability for faculty and educators to collaborate and share an SBME curriculum with other institutions and organizations; (3) provides the ability to define simulation scenarios consisting of "learning events" that are mapped to specific skills, and curriculum goals/objectives to be trained and assessed; (4) captures and tracks quantitative performance ratings and feedback from instructors across simulation participants over time; and (5) collects objective physiological measurements related to performance, skill acquisition, and functional state (e.g., stress) of health care providers participating in the SBME.

Simulation-based research shows that SBME promotes learner acquisition and maintenance of clinical knowledge, attitudes, and skills. SBME is a powerful educational tool that increases measurable medical learner competence in the laboratory, during patient care, and improves patient health outcomes quantitatively. SBME technology works because it is coupled with mastery learning and deliberate practice, involves skilled faculty, has curriculum integration with institutional endorsement, and receives healthcare system acceptance. SBME research becomes translational science when it stretches the outcome measurement just like its biomedical counterparts. SBME demonstrates that results achieved in the educational laboratory transfer to improved downstream patient care practices and improved patient and public health.

Simulation-based training for healthcare providers is also a viable, efficacious training tool, particularly for training non-technical team-working skills. These skills include communication, decision making, leadership, task management, and monitoring, that are important to effective teamwork, as well as error prevention and hospital adverse events. Simulation-based assessments are essential to solving some of these challenges. Good educational outcomes, from technical skills to specific learner performance-related behaviors, require a protected and proctored experience within a curriculum with proficiency-based goals. Correlation alone does not establish validity.

Due to the limitations of conventional SBME, PREPARE was developed as a multi-tiered learning management system. This platform provides prediction of healthcare provider skill acquisition and future training requirements. PREPARE is an intelligent learning management system that ensures healthcare providers in training as well as experienced healthcare providers receive training or retraining when necessary, thereby optimizing SBME costs, real-world healthcare delivery, and patient outcomes simultaneously. PREPARE is completely agnostic to simulation technologies and can be implemented regardless of the specific equipment on-site at the simulation center. This is important so that it can be used independent of the type of simulation technology available and allows widespread use of the system. PREPARE is a comprehensive measurement and assessment platform that collects a number of metrics and measures at the learner, instructor, and environmental level as shown in FIG. 1. Most measures generated and derived by PREPARE are standardized and allow the assessment of both SBME participant skill acquisition and the effectiveness of curriculum across any discipline or specialty.

PREPARE offers a data-driven application with a number of measurement and assessment capabilities that provide learners and simulations participants a wealth of quantitative and objective measures of their skill and knowledge acquisition. Additionally, the completely customizable pre- and post-assessment forms that capture relevant performance measures before and after exposure to curriculum and training provide instructors insight into the effectiveness of their curriculum. Because all of the performance measures logged and derived by PREPARE are mapped to specific curriculum goals and learning objectives, there are quantitative feedback and measures for instructors and stakeholders to evaluate whether curriculum is effective or needs modification. PREPARE contains an intuitive set of data visualizations which provide both SBME participants and instructors insight into system measures collected over time during training exposure such that they can track progress and seek additional training when necessary.

Figure 5:
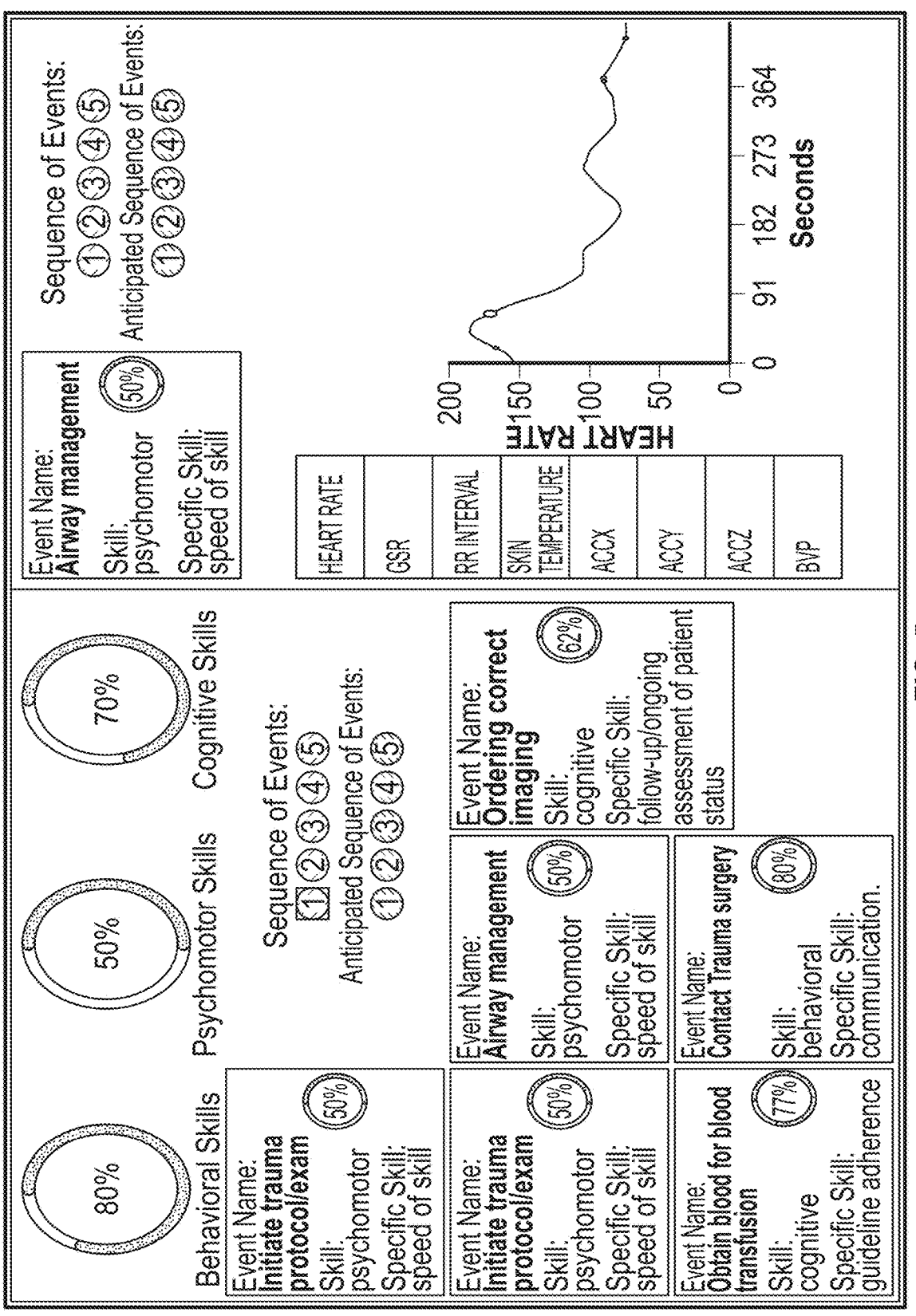
FIG. 5: Example data visualization user interfaces designed to provide insight to learners and instructors.

FIG. 5 shows information represented within PREPARE user interfaces (UIs) that track observer-based performance measures documented by expert observers/instructors (see FIG. 5, left) and objective physiological derived measures such as heart rate (see FIG. 5, right) that are mapped and associated with "learning events" that are key measurable focus points of curriculum created in PREPARE. The hierarchy of these various system measures is important for standardization of creation, assessment, and evaluation of curriculum using PREPARE.

Figure 6:
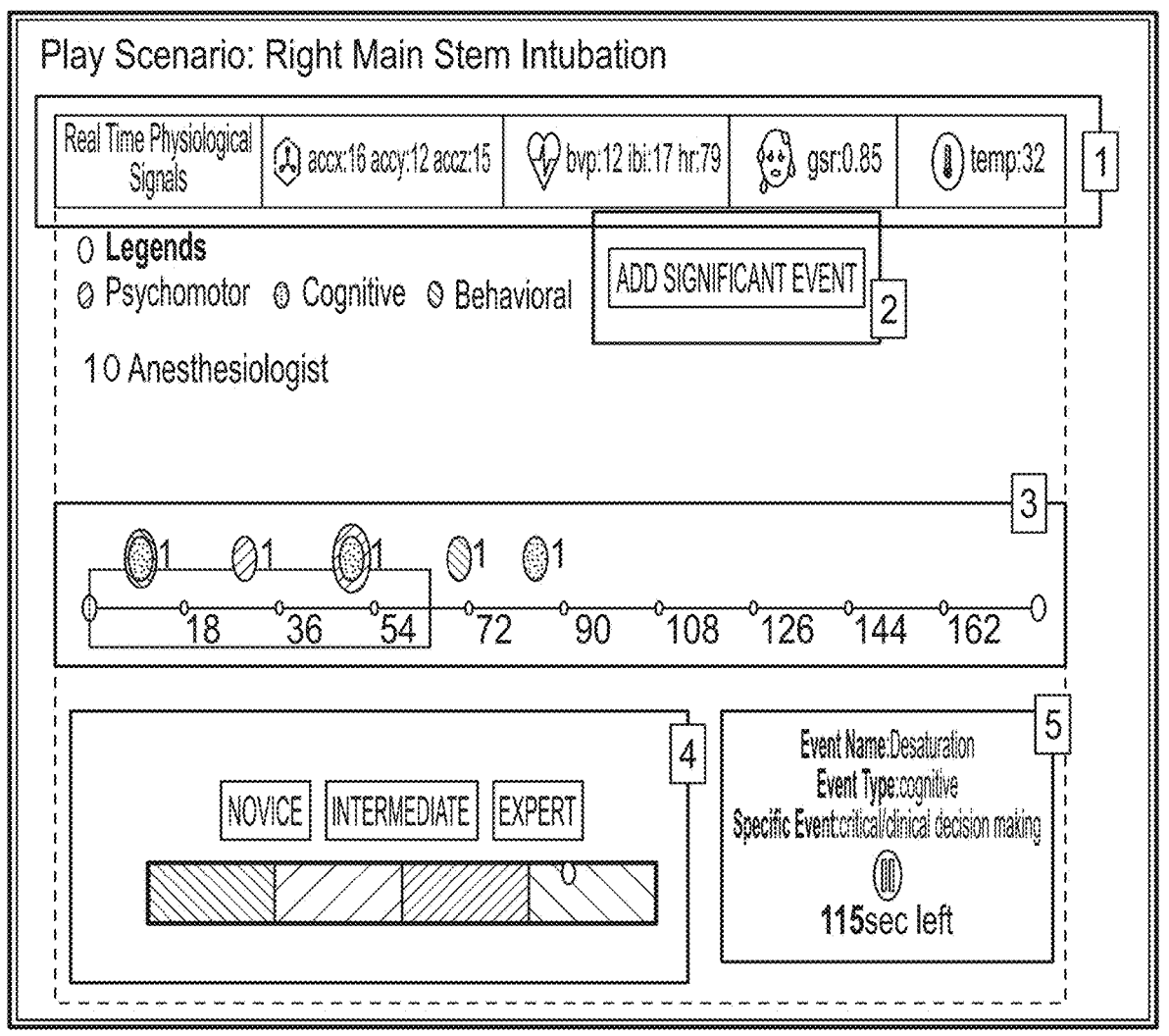
FIG. 6: Example user interface providing system measurement and assessment capabilities.

As mentioned above, one of the important aspects of PREPARE is that it provides a platform that standardizes creation, assessment, and evaluation of SBME curriculum. By using PREPARE, it is possible to create simulation scenarios consisting of various "learning events" populated by instructors/faculty at a second by second resolution across a predefined scenario timeline as shown in FIG. 6 (item #3). These "learning events" are mapped to specific skills/knowledge that are intended to be trained within a scenario or SBME curriculum (see FIG. 6, item #5). The performance of SBME participants and learners during these "learning events" are evaluated by expert observers and instructors using PREPARE in real-time during simulation exercises. There are three types of performance measures associated with each "learning event" mapped in PREPARE. Two of the performance measures are evaluated and derived at the instructor level. The first instructor level measure includes the evaluation of performance at a specific level as one of three finite classes: novice, intermediate, or expert (FIG. 6, item #4). Enabling the collection of measures at this standardized level is important for the development of machine learning-based models, such as classifiers that are able to predict or classify the skill/proficiency level of the simulation participant based on all the data sources generated and documented using PREPARE.

The second performance measure generated using PREPARE includes an expert faculty/instructor assessment in real-time during SBME on a color-coded scale which is translated to a quantitative measure of performance on a 0-100 scale as shown in FIG. 6, item #4.

The third performance measure includes the collection and derivation of physiological variables such as heart rate, heart rate variability (HRV), and galvanic skin response (GSR) or electrodermal activity (EDA), that can be made available by collecting and processing data from commercially available physiological monitors and wearables. All performance measures are time-stamped in PREPARE, thereby enabling analysis and trending of physiological responses around such events to associate learner-level physiological measures with performance measures. Such measures are displayed in real-time as shown in FIG. 6, item #1, and the entire time series and trending information is made available via a debriefing module for instructors and SBME participants to review. The PREPARE system automatically queues instructors to provide assessments for each of the "learning events" that are predefined and pre-populated by faculty to occur at some instance in time across a scenario timeline. Furthermore, it is also possible to annotate measures entered into the system or add/tag significant events to provide more context to measures or assessments made and generated by PREPARE (FIG. 6, item #2).

Figure 7:
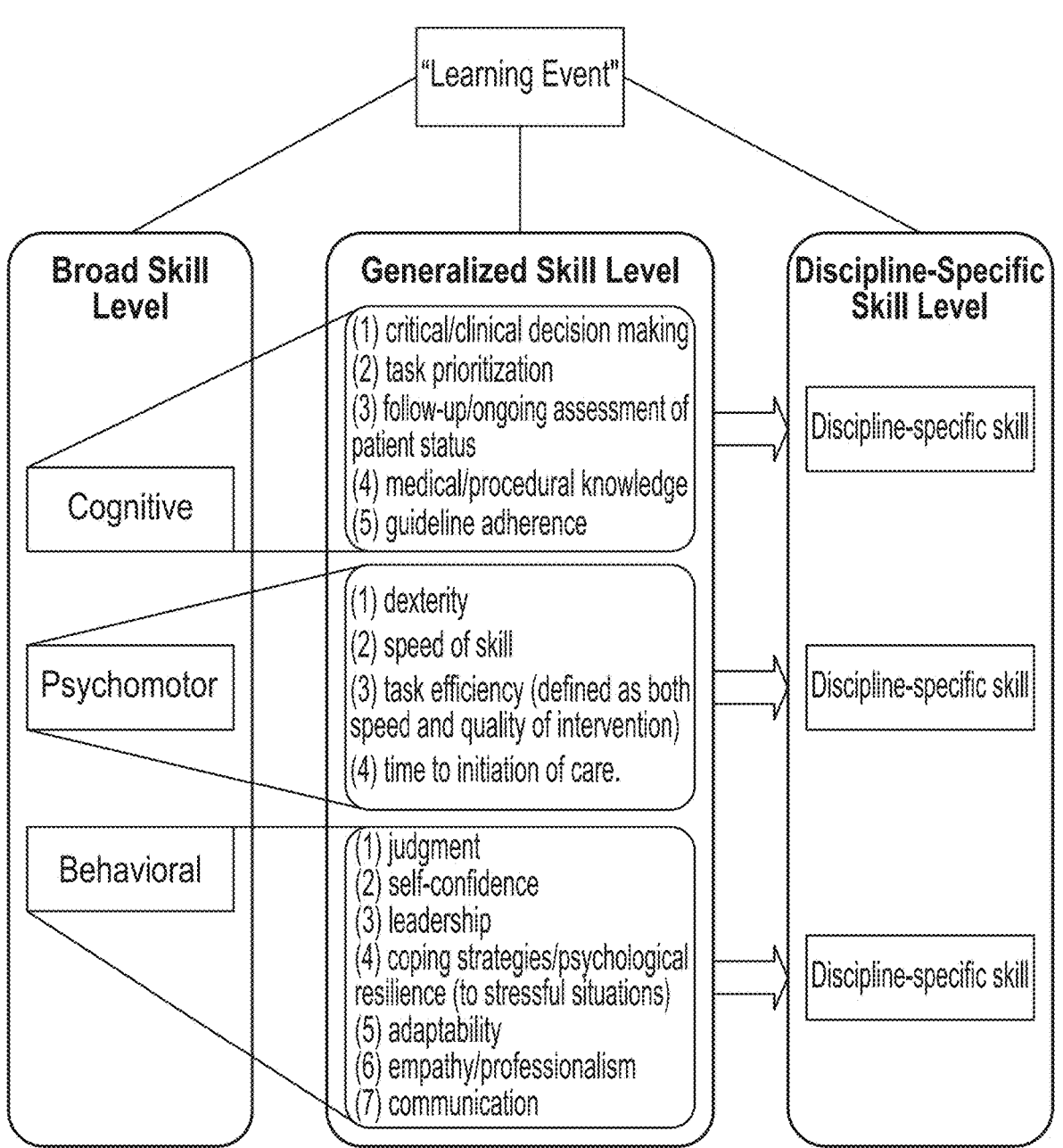
FIG. 7: Hierarchy of classifying "learning events" within an example system which are mapped to specific performance measures collected and derived within the software.

All performance measures collected and derived by PREPARE are defined in a way that promotes standardization of creation, assessment, and evaluation of SBME at the learner, instructor, and curriculum levels. To promote standardization, "learning events" and corresponding performance measures of skills intended to be trained and learned are defined in a three-level hierarchy as shown in FIG. 7. Broad skills are characterized as cognitive, behavioral, and psychomotor. Generalized skills are defined as a more specific subset of skills falling under each broad skill category. Lastly, PREPARE provides the mechanism to define and evaluate skills at the discipline-specific level where skills that are specific to a discipline or speciality can be defined and evaluated within the software. For example, a discipline-specific skill of an anesthesia provider such as difficult airway management can be defined in the software as a psychomotor skill at the broad level and can be defined as task efficiency at the generalized level. Conversely, a discipline-specific skill for an emergency medicine physician, anesthesia provider, or internal medicine physician can be defined as differentiating between atrial fibrillation and other supraventricular tachycardias, which can be further classified as a cognitive skill and medical/procedural knowledge at the broad and generalized skill levels. The importance of defining these sets of broad and generalized skills is that independent of discipline or speciality, there is a common set of evaluation criteria for healthcare professionals that participate in SBME. This design is important as it enables both standardization as well as discipline/speciality specific assessment to provide a unique comprehensive assessment capability.

PREPARE was used by faculty and instructors at the University of Toledo's Health Science Campus during SBME that involved multiple disciplines, including medical students, physician assistant students, local paramedics and first responders, as well as residency programs within anesthesiology, emergency medicine, and surgery. A local server was established to host PREPARE's frontend (UIs and data entry components) and backend services (database and data processing and modeling/analytics infrastructure). Faculty and learners/simulation participants could access all system functionality via secure login from a URL when connected to the network.

Figure 8:
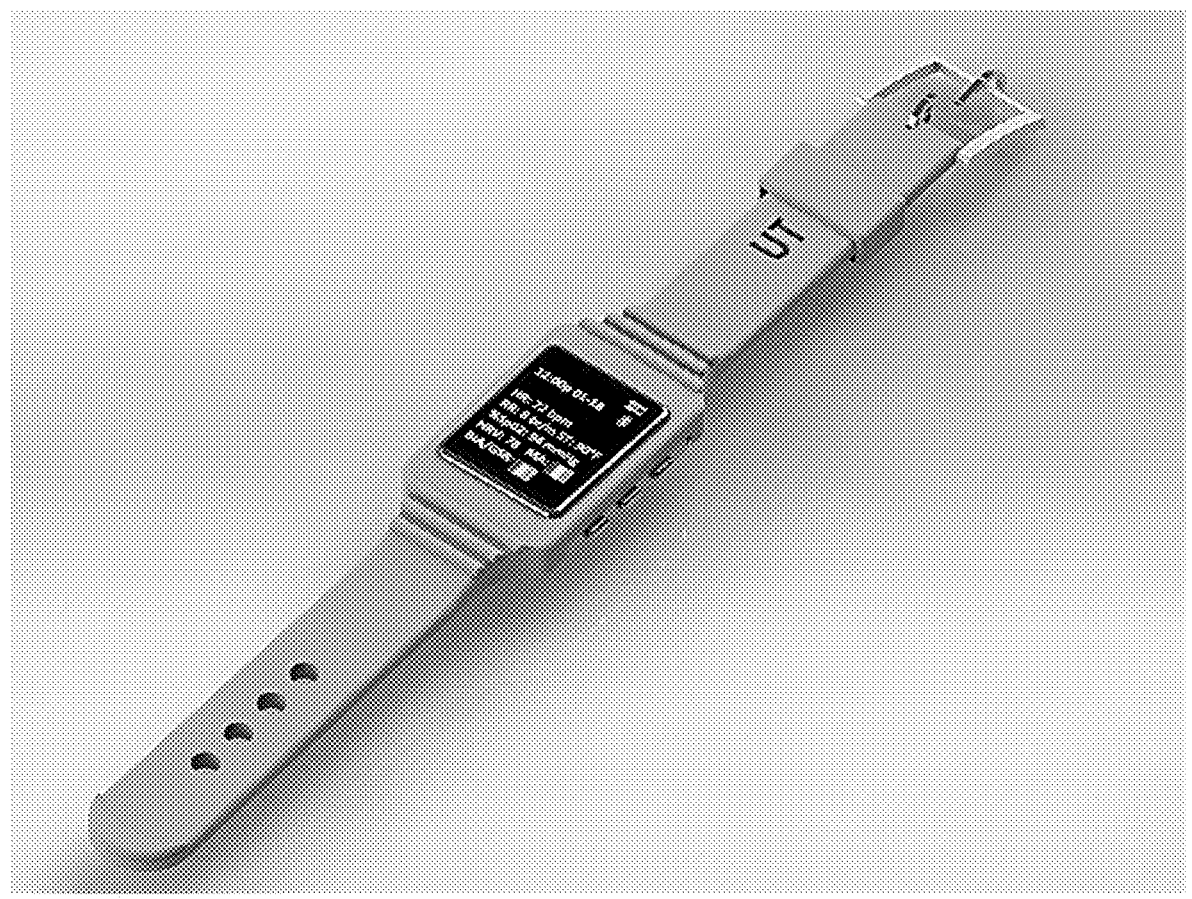
FIG. 8: Illustration of a non-limiting example wrist-worn wearable device.

During a debriefing process, a faculty member associates physiological data (heart rate) from one of the learners with performance ratings documented by them. PREPARE is extremely flexible in order to accommodate data collection from any Bluetooth or wireless physiological wearable platform. For this example, the system was configured to collect and process data from an example wrist-worn physiological wearable technology, such as that shown in FIG. 8, that measures a raw blood volume pulse signal, heart rate, EDA (i.e., sweat), skin temperature, and motion via three-axis accelerometer. An additional application has been developed within PREPARE to process raw data from the E4 and extract other useful variables from the raw physiological data including but not limited to the more instantaneous measures of heart rate and heart rate variability (HRV), which is a useful measure of stress and emotional regulation. PREPARE is also able to collect data from a wireless electroencephalogram (EEG) headset. This device enables collection of electrical activity from the brain which can be associated with measures of mental demand or cognitive workload.

Results

A pilot study aimed at collection of data with PREPARE was completed. The study collected data and measures from emergency medicine residents, third- and fourth-year medical students, and local fire department paramedic trainees. The study produced results indicating that there is a correlation between physiological responses and performance measured around "learning events" programmed into PREPARE across multiple disciplines and SBME participants with variable levels of experience. FIG. 4 identifies some correlations with performance as documented by faculty/instructors (x-axis) and percentage deviation from resulting or baseline heart rate (y-axis) amongst SBME participants monitored by PREPARE. This figure demonstrates there are groups or clusters indicating a smaller deviation from baseline or resting heart rate (equivalent to a stress response) is associated with better instructor-documented performance ratings. Cluster group 1 in FIG. 4 included heart rate values with the smallest deviation (<15%) from baseline heart rate and the highest performance ratings (≥75 out of 100). This group also contains the highest number of instructor-documented performance ratings (24 out of 45 ratings, or 53.3% of all ratings) collected across the initial 10 pilot study participants. Heart rate values and percentage deviation from baseline were calculated for symmetrical windows around "learning events" that were evaluated by instructors (15 seconds before and after the event was rated) using PREPARE. The data can be further analyzed through various algorithms such as a K-means nearest neighbor clustering algorithm.

The results in FIG. 4 indicate that physiological measures provide a reliable objective measure to evaluate proficiency levels and expertise in SBME participants. Physiological measures including stress responses that are captured around "learning events" using PREPARE indicate comfortability and the proficiency or skill level of simulation participants. When a participant is less proficient, the stress response as indicated by physiological data (e.g., heart rate, EDA, etc.) is more pronounced in novice or intermediate participants than experts.

PREPARE provided actionable information and quantitative information that identified areas of good performance and areas which need improvement. Additionally, PREPARE improved the debriefing process and measures to help guide discussion with SBME participants much more effectively, with quantitative measures.

Certain embodiments of the systems and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the systems and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A method for managing learning, the method comprising:

defining a learning event associated with a performance of a learner skill by a learner in a scenario, wherein defining the learning event includes categorizing the learner skill in a three-level hierarchy, wherein a first level of the three-level hierarchy includes a cognitive skill, a psychomotor skill, or a behavior skill, a second level of the three-level hierarchy includes subset of skills of the first level of the three-level hierarchy, and a third level of the three-level hierarchy includes discipline-specific skills;

generating, from an input by an observer, an evaluation of the performance of the learner skill by the learner during the learning event, wherein the evaluation of the performance of the learner skill is encoded as a novice, an intermediate, or an expert, and wherein the evaluation of the performance of the learner skill is also applied a rating on a continuous scale;

collecting neurophysiological measurements of the learner during the learning event, wherein the neurophysiological measurements are acquired through a wearable device worn by the learner, wherein the wearable device does not average the neurophysiological measurements, wherein the neurophysiological measurements comprise one or more of electrocardiography (ECG) data, photoplethysmography (PPG) data, respiration data, linear motion data, skin temperature data, rotational motion data, heart rate data, pulse data, peripheral capillary oxygen saturation (SpO2), electroencephalogram (EEG), functional near-infrared spectroscopy (fNIRS) data, eye tracking data, pupilometry data, gaze pattern data, voice stress data, biomarker data, and genetic marker or fingerprint data;

associating the evaluation and the neurophysiological measurements with the learning event to generate correlated data;

building models from the correlated data to generate an assessment, wherein the assessment includes predictions about real-world performance of a skill by the learner, predictions about a need for training by the learner, a recommendation for a type of training for the learner to undergo, a recommendation for a frequency of training for the learner to undergo, a prediction of an expertise level of the learner, an evaluation of real-world performance of the skill, an evaluation of training effectiveness, or dynamically personalize training for the learner; and using an artificial intelligence to personalize training and enhance real-world performance based on the neurophysiological measurements.

2. The method of claim 1, further comprising collecting and integrating data regarding one or more of learner demographics and experience level in a discipline, instructor-documented performance ratings, preassessment data and results, frequency and duration of simulation exposure, post-assessment data and results, medical or procedural knowledge, sleep quality for prior night and preceding week, and caffeine consumption.

3. The method of claim 2, wherein the preassessment data and results or the post-assessment data and results include self-reported measures from the learner.

4. The method of claim 1, wherein the observer defines the learning event.

5. The method of claim 1, comprising collecting data regarding training or educational activities of the learner.

6. The method of claim 1, comprising collecting data regarding real-world performance of a skill by the learner.

7. The method of claim 1, further comprising providing real-time feedback to the learner regarding learner state.

8. The method of claim 1, further comprising tracking real-world performance of a skill, or associating training effectiveness with real-world performance data.

9. The method of claim 1, further comprising providing analytics that automatically associate measures and data collected to training outcomes and real-world performance.

10. The method of claim 1, further comprising accounting for missing data.

11. The method of claim 1, further comprising identifying groups of similar learners based on measures and data collected over time associated with training or performance outcomes.

12. The method of claim 1, wherein the wearable device obtains behavioral data.

13. The method of claim 1, further comprising collecting pre-assessments and post-assessments, wherein the pre-assessments and post-assessments gather data related to important demographics and learner-specific conditions that impact learner performance or an ability for the learner to learn;

wherein the post-assessments quantify effectiveness of curriculum and knowledge gained related to real-world performance.

14. A method for managing learning, the method comprising:

defining a learning event associated with a performance of a learner skill by a learner in a scenario, wherein defining the learning event includes categorizing the learner skill in a three-level hierarchy, wherein a first level of the three-level hierarchy includes a cognitive skill, a psychomotor skill, or a behavior skill, a second level of the three-level hierarchy includes subset of skills of the first level of the three-level hierarchy, and a third level of the three-level hierarchy includes discipline-specific skills;

generating, from an input by an observer, an evaluation of the performance of the learner skill by the learner during the learning event;

acquiring behavioral assessment data relating to the learning event, wherein the behavioral assessment data is acquired through a wearable device worn by the learner, wherein the wearable device does not average the acquired behavioral assessment data, wherein the behavioral assessment data comprise one or more of electrocardiography (ECG) data, photoplethysmography (PPG) data, respiration data, linear motion data, skin temperature data, rotational motion data, heart rate data, pulse data, peripheral capillary oxygen saturation (SpO2), electroencephalogram (EEG), functional near-infrared spectroscopy (fNIRS) data, eye tracking data, pupilometry data, gaze pattern data, voice stress data, biomarker data, and genetic marker or fingerprint data;

associating the evaluation and the behavioral assessment data with the learning event to generate correlated data;

building models from the correlated data to generate an assessment, wherein the assessment includes predictions about real-world performance of a skill by the learner, predictions about a need for training by the learner, a recommendation for the learner, a prediction of an expertise level of the learner, an evaluation of real-world performance of the skill, an evaluation of training effectiveness, or dynamically personalize training for the learner; and generating the assessment on a graphical user interface; and using an artificial intelligence component to identify behaviors in the acquired behavioral assessment data.

15. The method of claim 14, comprising monitoring lifestyle, active status, and emotional states of the learner.

16. The method of claim 1, wherein the physiological measurements are normalized to measure a percentage deviation from algorithm-derived baseline stats.

\* \* \* \* \*